United States Patent [19]

Wong

[11] Patent Number: 5,835,389
[45] Date of Patent: Nov. 10, 1998

[54] CALCULATING THE ABSOLUTE DIFFERENCE OF TWO INTEGER NUMBERS IN A SINGLE INSTRUCTION CYCLE

[75] Inventor: Roney S. Wong, Sunnyvale, Calif.

[73] Assignee: Samsung Electronics Company, Ltd., Rep. of Korea

[21] Appl. No.: 636,048

[22] Filed: Apr. 22, 1996

[51] Int. Cl.$^6$ .............................. G06F 7/00; G06F 15/00
[52] U.S. Cl. .............................. 364/715.012; 364/736.01; 364/769; 364/770; 327/355
[58] Field of Search .................... 364/736.01, 736.04, 364/748.11, 715.012, 750.5, 768, 769, 770, 784.01–786.04; 327/355, 361; 345/16

[56] References Cited

U.S. PATENT DOCUMENTS

| | | | |
|---|---|---|---|
| 4,218,751 | 8/1980 | McManigal | 364/784 |
| 4,825,400 | 4/1989 | Simoncic et al. | 364/748.11 |
| 5,235,536 | 8/1993 | Matsubishi et al. | 364/736.04 |
| 5,373,459 | 12/1994 | Taniguchi | 364/715.012 |
| 5,448,509 | 9/1995 | Lee et al. | 364/736.5 |

*Primary Examiner*—Emmanuel L. Moise
*Attorney, Agent, or Firm*—Skjerven, Morrill, MacPherson, Franklin & Friel LLP; David M. Sigmond

[57] ABSTRACT

The absolute difference of two signed or unsigned integer numbers (A, B) is calculated in one instruction cycle by bit-complementing the B operand, summing the A and bit-complemented B operands to obtain an intermediate result, detecting whether the intermediate result overflows, then either incrementing the intermediate result or bit-complementing the intermediate result as appropriate. The B operand is bit-complemented by a first inverter circuit (302). The A and bit-complemented B operands are summed in an adder (304) that provides a sum and sum-plus-one output. The sum output is bit-complemented by a second inverter circuit (306). A multiplexer (310) under the control of a control circuit (308) selects one of the bit-complemented sum output and sum-plus-one output, based on inspection of the most significant bits of the A operand, B operand, and sum output, a carry-out bit from the sum output, and a mode signal indicative of whether the operands are signed or unsigned values.

21 Claims, 5 Drawing Sheets

CURRENT FRAME          NEXT FRAME

CALCULATING THE ABSOLUTE DIFFERENCE OF TWO INTEGER NUMBERS IN A SINGLE INSTRUCTION CYCLE

BACKGROUND OF THE INVENTION

1. Field of the Invention

The present invention relates to calculating the absolute difference of two integer numbers, and more particularly to single instruction cycle calculation of the absolute difference of two signed or unsigned integer numbers with overflow detection.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

Figure 1:
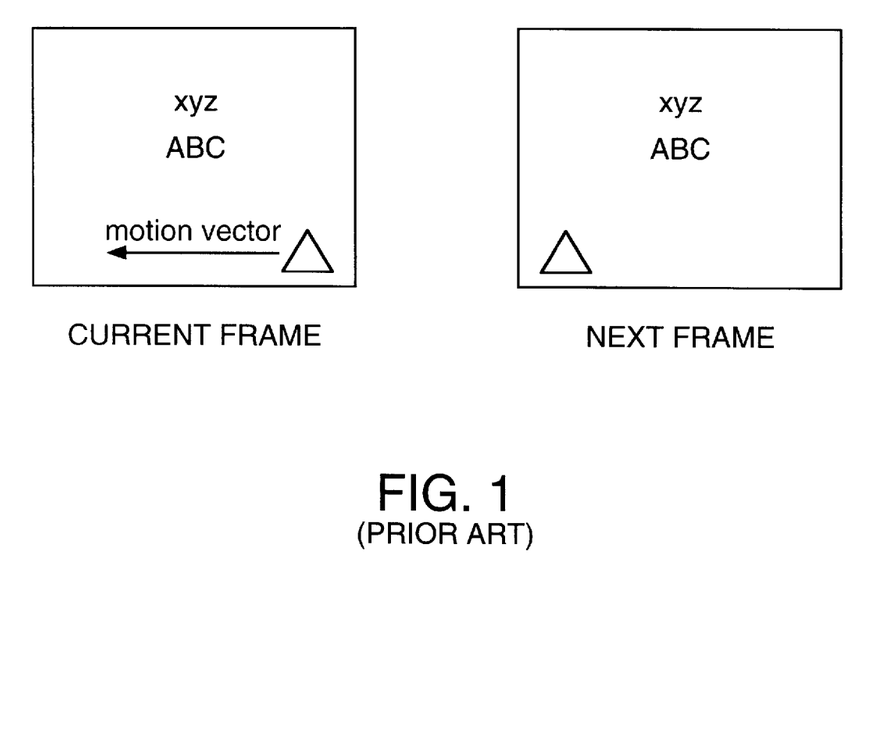
FIG. 1 is an illustrative block showing motion estimation as specified by the MPEG standard.

In most video sequences, the content of the image of one frame is usually similar to the next frame. Most video compression schemes exploit this characteristic by using a previous frame to generate a prediction of the current frame. For instance, in FIG. 1, the only difference between the two frames is that the triangular object has moved to the left. In block-based motion compression, the frame being encoded is divided into blocks of M×M size. For each block being encoded, a search is performed to identify the most closely matching block in the previous reconstructed frame. The closeness of the match, or distance between the blocks, is typically measured by the sum of absolute differences between corresponding pixels in the two blocks.

Full search motion estimation under the MPEG-1 standard includes calculation of the motion vector mv(h,v) where h is a horizontal offset in the range of {−1024, −1023, ... 0 ... 1023}, and v is a vertical offset in the range of {−1024, −1023, ... 0 ... 1023}. Consider the case where O is the current picture frame, P is the predicted picture frame, and each picture frame comprises 8×8 blocks. Using x and y as indexes for the picture search window, for each (h,v) pair the mean square error between the data being coded (O(x,y)) and the search region on the predictor (P(x+h, y+v)) can be calculated. The pair with the minimum mean squared error is the selected motion vector. Accordingly, full search motion estimation is based on the expression $$mv(h, v) = \min(h, v) \text{ of } \sum_{x=0}^{15} \sum_{y=0}^{15} (O(x, y) - P(x + h, y + v))^2 \quad (1)$$

where $$-1024 \leq h \leq 1023$$

$$-1024 \leq v \leq 1023$$

In order to minimize calculations, expression (1) is often simplified into the expression $$mv(h, v) = \min(h, v) = \sum_{x=0}^{15} \sum_{y=0}^{15} |O(x, y) - P(x + h, y + v)| \quad (2)$$

where $$-1024 \leq h \leq 1023$$

$$-1024 \leq v \leq 1023$$

which requires calculating the absolute difference between O(x,y) and P(x+h, y+v). Thus, in MPEG motion processing there is a need for fast calculation of the absolute difference of two operands in accordance with the generic expression $$|X_1 - X_2| \quad (3)$$

Numerically, the absolute difference between two integers is the distance between them on the number line. For instance, the absolute difference between 5 and 3 is 2, the absolute difference between −5 and 3 is 8, and the absolute difference between −5 and −3 is 2. An n-bit operand can represent $2^n$ different integers. For instance, an n-bit operand can represent the integers $\{0 \ldots 2^n-1\}$ or the integers $\{-2^{n-1} \ldots 0 \ldots 2^{n-1}-1\}$. For example, a four-bit unsigned operand can represent the integers {0, 1 ... 14, 15}, whereas a four-bit signed operand can represent the integers {−8, −7 ... 6, 7}. In MPEG motion processing, it is necessary to implement expression (3) for both signed and unsigned operands.

Expression (3) has been implemented by calculating the difference between $X_1$ and $X_2$, and if the difference is negative then transforming the difference to a positive number. While this is a simple operation, it may take a general purpose computer several instruction cycles to perform. In calculation intensive applications such as MPEG motion processing, it is highly desirable to calculate the absolute difference of two integers in a rapid and efficient manner.

SUMMARY OF THE INVENTION

A method or apparatus in accordance with the present invention advantageously provides in one instruction cycle the absolute difference of two signed or unsigned integer numbers. An n-bit adder can accommodate n-bit operands. Moreover, overflow detection is provided thereby preserving arithmetic accuracy.

These and other advantages are realized in the present invention, in which one embodiment is a method of operating a circuit to obtain an unsigned absolute difference of first and second operands, including signed and unsigned integer numbers. This embodiment includes bit-complementing the second operand, summing the first and bit-complemented second operands to obtain an intermediate result, determining whether the intermediate result overflows. The intermediate result is incremented to obtain the unsigned absolute difference (i) when the operands are unsigned numbers and the overflow occurs, (ii) when the operands are signed numbers and the overflow occurs and the intermediate result is negative, or (iii) when the operands are signed numbers and the overflow does not occur and the intermediate result is positive. The intermediate result is bit-complemented to obtain the unsigned absolute difference (i) when the operands are unsigned numbers and the overflow does not occur, (ii) when the operands are signed numbers and the overflow occurs and the intermediate result is positive, or (iii) when the operands are signed numbers and the overflow does not occur and the intermediate result is negative.

In determining whether overflow occurs, the first and bit-complemented second operands and the intermediate result are considered signed numbers if the first and second operands are signed numbers, and likewise the first and bit-complemented second operands and the intermediate result are considered unsigned numbers if the first and second operands are unsigned numbers.

In another embodiment, the present invention is an apparatus comprising first and second inverter circuits, a sum adder, a sum-plus-one adder, a control circuit, and a multiplexer in combination. The first inverter circuit has an operand input coupled to the second operand for providing a bit-complemented second operand. The sum adder and sum-plus-one adder each have operand inputs coupled to the first and bit-complemented second operands. The second inverter circuit has an operand input coupled to the sum output for providing a bit-complemented sum output. The multiplexer has a first input coupled to the bit-complemented sum output, and a second input coupled to the sum-plus-one output. The control circuit has inputs coupled to the most significant bit of the first operand, of the second operand, and of the sum output, to the carry-out bit of the sum adder, and to a mode signal indicating whether the operands are signed or unsigned numbers. The control circuit also has a control output coupled to a select input of the multiplexer.

BRIEF DESCRIPTION OF THE DRAWINGS

In the drawings, in which like reference characters indicate like parts.

DETAILED DESCRIPTION OF THE PREFERRED EMBODIMENTS

The absolute difference of two signed or unsigned integer numbers is calculated in one instruction cycle, such that the absolute difference is an unsigned integer, by bit-complementing the second operand, summing the first and bit-complemented second operands to obtain an intermediate result, and either incrementing the intermediate result or bit-complementing the intermediate result as appropriate. For unsigned operands, the incrementing or bit-complementing is based on whether the intermediate result overflows (treating the first operand, bit-complemented second operand, and intermediate result as unsigned numbers). If overflow occurs then increment the intermediate result, whereas if no overflow occurs then bit-complement the intermediate result. For signed operands, the incrementing or bit-complementing is based on whether the intermediate result is positive or negative, and also based on whether overflow occurs (treating the first operand, bit-complemented second operand, and intermediate result as signed numbers). If overflow occurs and the intermediate result is negative, or if no overflow occurs and the intermediate result is positive, then increment the intermediate result. If overflow occurs and the intermediate result is positive, or if no overflow occurs and the intermediate result is negative, then bit-complement the result.

As used herein, signed numbers are represented in 2's complement form in which positive numbers include zero. Positive and negative numbers indicate that the numbers are signed. Determining whether a signed intermediate result is positive or negative is accomplished by inspection of its most significant bit ("MSB"). For a positive intermediate result the MSB=0, whereas for a negative intermediate result the MSB=1. Bit-complementing is the equivalent of a 1's complement operation. For instance, $\bar{B}$ designates the bit-complemented version of B. Finally, incrementing refers to increasing by one.

For purposes of overflow detection, the bit-complemented second operand is considered unsigned if the first and second operands are unsigned, and likewise the bit-complemented second operand is considered signed if the first and second operands are signed. For unsigned numbers, overflow is detected by inspection of the carry-out bit of the intermediate result. If the carry-out bit is 1 then overflow occurs, whereas if the carry-out bit is 0 then no overflow occurs. For signed numbers, overflow is detected by inspection of the MSBs of the first operand, the bit-complemented second operand, and the intermediate result. If the MSBs of the first operand and the bit-complemented second operand both have a first logical value (such as 1) and the MSB of the intermediate result has a second logical value (such as 0) then overflow occurs, otherwise no overflow occurs. Other overflow detection techniques for signed and unsigned binary numbers are well-known in the art.

For a more complete understanding of the present invention, it is useful to consider some of the underlying mathematics. In 2's complement representation, the negative of an integer number is provided by taking the 1's complement of the number and then incrementing, that is, $$-B = \bar{B} + 1 \qquad (4)$$

and thus $$\bar{B} = -B - 1 \qquad (5)$$

In view of expression (5), adding A to the bit-complemented version of B provides $$A + \bar{B} = A + (-B - 1) \qquad (6)$$

$$A + \bar{B} = A - B - 1 \qquad (7)$$

If A>B, then the right side of expression (7) must be greater than or equal to zero, in which case incrementing both sides of expression (7) yields $$(A + \bar{B}) + 1 = (A - B - 1) + 1 \qquad (8)$$

$$A + \bar{B} + 1 = A - B \qquad (9)$$

which is the absolute difference of A and B since A>B.

If A=B, then the right side of expression (7) must be equal to −1, in which case incrementing both sides of expression (7) yields $$(A+\bar{B})+1=(0-1)+1 \tag{10}$$

$$A+\bar{B}+1=0 \tag{11}$$

which is the absolute difference of A and B since A=B.

If A<B, then the right side of expression (7) must be negative, in which case bit-complementing both sides of expression (7) yields $$\overline{A+\bar{B}}=\overline{A-B-1} \tag{12}$$

The right side of expression (12) can be modified in accordance with expression (5) as follows $$\overline{A+\bar{B}}=-(A-B-1)-1 \tag{13}$$

$$\overline{A+\bar{B}}=-A+B+1-1 \tag{14}$$

$$\overline{A+\bar{B}}=B-A \tag{15}$$

which is the absolute difference of A and B since A<B.

Figure 2:
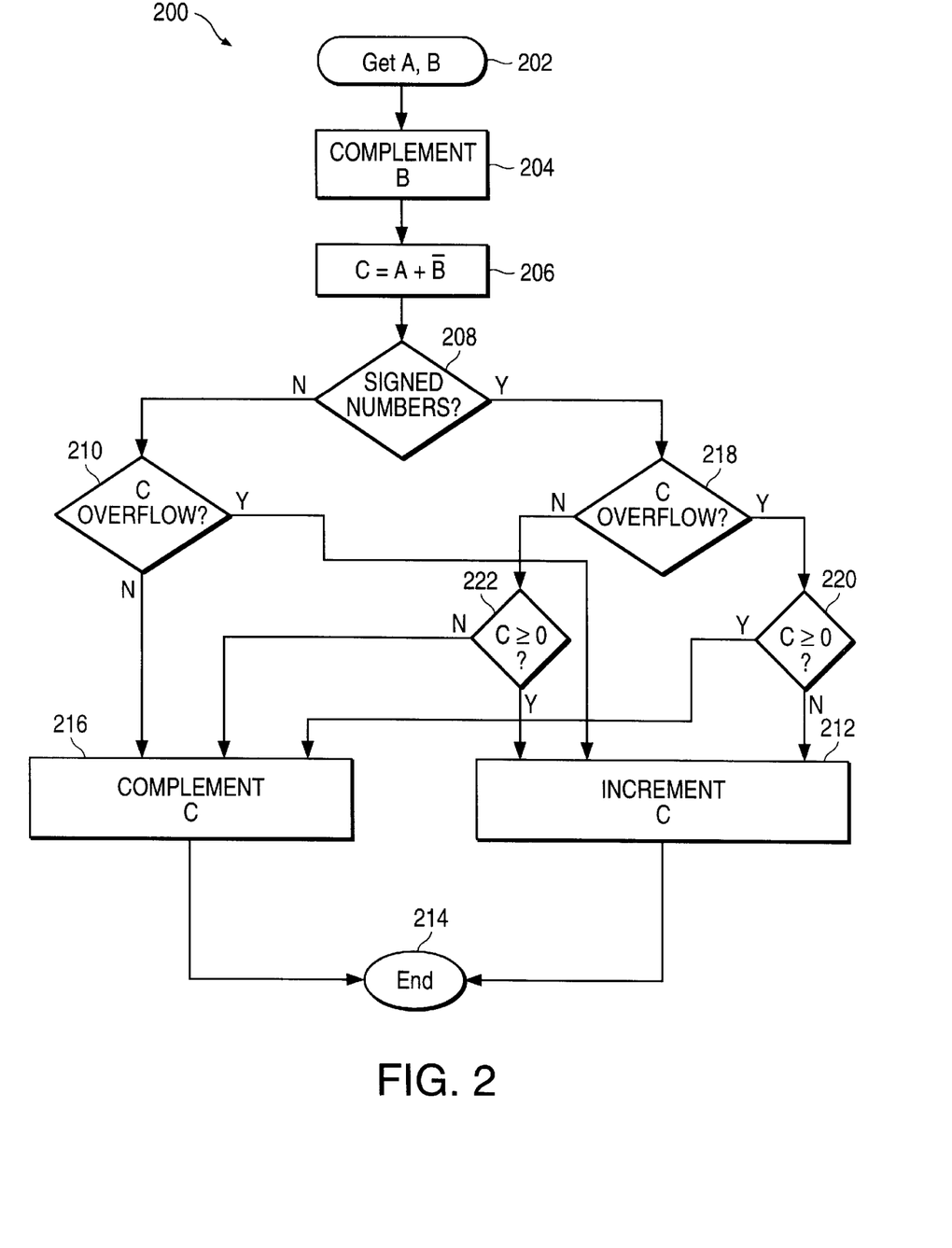
FIG. 2 is a flow chart of an algorithm in accordance with the present invention.

FIG. 2 is a flow chart of algorithm 200 in accordance with the invention. At step 202, binary operands A and B are obtained. At step 204, operand B is bit-complemented to obtain $\bar{B}$. At step 206, the intermediate result C is obtained by summing operands A and $\bar{B}$. Decision step 208 then tests whether operands A and B are signed or unsigned numbers. If operands A and B are unsigned numbers, decision step 208 branches to decision step 210 which tests whether overflow occurs at step 206. If so, the algorithm proceeds to step 212 where C is incremented and the algorithm ends at step 214, otherwise the algorithm proceeds to step 216 where C is bit-complemented and the algorithm ends at step 214. Returning to decision step 208, if operands A and B are signed numbers then decision step 208 branches to decision step 218 which tests whether overflow occurs at step 206. If decision step 218 detects overflow then the algorithm branches to decision step 220, whereas if decision step 218 detects no overflow then decision step 222 is next. At decision step 220, if C is positive then C is bit-complemented at step 216 and the algorithm ends at step 214, whereas if C is negative then C is incremented at step 212 and the algorithm ends at step 214. At decision step 222, if C is positive then C is incremented at step 212 and the algorithm ends at step 214, whereas if C is negative then C is bit-complemented at step 216 and the algorithm ends at step 214.

Variations to algorithm 200 are apparent. For instance, for signed numbers, overflow can be tested after C is tested for being positive or negative. Likewise, C can be the sum of B+$\bar{A}$. Furthermore, both $\bar{C}$ and C+1 an be calculated and the appropriate result selected.

Consider the case of unsigned operands in more detail. For unsigned operands, overflow is detected by inspection of the carry-out bit when the intermediate result is calculated. In summary, for unsigned operands increment the intermediate result if overflow occurs, else bit-complement the intermediate result. Various examples of unsigned operands applied to algorithm 200 are listed below in Table 1.

TABLE 1

ABSOLUTE DIFFERENCE OF UNSIGNED OPERANDS

| Operands A and B (Decimal) | Operands A and B (Binary) | C = A + $\bar{B}$ | C Overflow | C Sign Bit | Increment or Complement C | Result |
|---|---|---|---|---|---|---|
| 5 | 0101 | 0101 | Yes | N.A. | Increment | 0001 |
| 3 | 0011 | +1100 | | | | +0001 |
| (2 abs dif) | | 1 0001 | | | | 0010 (decimal 2) |
| 3 | 0011 | 0011 | No | N.A. | Complement | 1101 |
| 5 | 0101 | +1010 | | | | ↓ |
| (2 abs dif) | | 0 1101 | | | | 0010 (decimal 2) |
| 12 | 1100 | 1100 | Yes | N.A. | Increment | 0000 |
| 11 | 1011 | +0100 | | | | +0001 |
| (1 abs dif) | | 1 0000 | | | | 0001 (decimal 1) |
| 10 | 1010 | 1010 | No | N.A. | Complement | 1100 |
| 13 | 1101 | +0010 | | | | ↓ |
| (3 abs dif) | | 0 1100 | | | | 0011 (decimal 3) |
| 15 | 1111 | 1111 | Yes | N.A. | Increment | 1110 |
| 0 | 0000 | +1111 | | | | +0001 |
| (15 abs dif) | | 1 1110 | | | | 1111 (decimal 15) |

Consider the case of signed operands where the intermediate result is positive (MSB=0). For signed numbers, overflow is detected by inspection of the most significant bits of the first operand, the bit-complemented second operand, and the intermediate result. If the MSBs of the first operand and the bit-complemented second operand have the same logical value but a different logical value than the MSB of the intermediate result then overflow occurs, otherwise no overflow occurs. In summary, for signed operands where the intermediate result is positive, if overflow occurs then bit-complement the intermediate result, otherwise increment the intermediate result. This is applicable to two positive operands, two negative operands, and a positive and negative operand. Various examples of signed operands applied to algorithm 200 where the intermediate result positive are listed below in Table 2.

TABLE 2

ABSOLUTE DIFFERENCE OF SIGNED OPERANDS WITH
POSITIVE INTERMEDIATE RESULT

| Operands A and B (Decimal) | Operands A and B (Binary) | C = A + B̄ | C Overflow | Sign Bit | Increment or Complement C | Result (Unsigned) |
|---|---|---|---|---|---|---|
| +5 | 0101 | 0101 | No | 0 | Increment | 0110 |
| −2 | 1110 | +0001 | | | | +0001 |
| (7 abs dif) | | 0 0110 | | | | 0111 (decimal 7) |
| −2 | 1110 | 1110 | No | 0 | Increment | 0010 |
| −5 | 1011 | +0100 | | | | +0001 |
| (3 abs dif) | | 1 0010 | | | | 0011 (decimal 3) |
| +7 | 0111 | 0111 | No | 0 | Increment | 0111 |
| −1 | 1111 | +0000 | | | | +0001 |
| (8 abs dif) | | 0 0111 | | | | 1000 (decimal 8) |
| −2 | 1110 | 1110 | Yes | 0 | Complement | 0111 |
| +6 | 0110 | +1001 | | | | ↓ |
| (8 abs dif) | | 1 0111 | | | | 1000 (decimal 8) |
| −5 | 1011 | 1011 | Yes | 0 | Complement | 0101 |
| +5 | 0101 | +1010 | | | | ↓ |
| (10 abs dif) | | 1 0101 | | | | 1010 (decimal 10) |

Consider the case of signed operands where the intermediate result is negative (MSB=1). Overflow is detected in the same manner as when the intermediate result is positive. In summary, for signed operands where the intermediate result is negative, if overflow occurs then increment the intermediate result, otherwise bit-complement the intermediate result. This is applicable to two positive operands, two negative operands, and a positive and negative operand. Various examples of signed operands applied to algorithm 200 where the intermediate result is negative are listed below in Table 3.

TABLE 3

ABSOLUTE DIFFERENCE OF SIGNED OPERANDS WITH
NEGATIVE INTERMEDIATE RESULT

| Operands A and B (Decimal) | Operands A and B (Binary) | C = A + B̄ | C Overflow | C Sign Bit | Increment or Complement C | Result (Unsigned) |
|---|---|---|---|---|---|---|
| −2 | 1110 | 1110 | No | 1 | Complement | 1000 |
| +5 | 0101 | +1010 | | | | ↓ |
| (7 abs dif) | | 1 1000 | | | | 0111 (decimal 7) |
| −5 | 1011 | 1011 | No | 1 | Complement | 1100 |
| −2 | 1110 | +0001 | | | | ↓ |
| (3 abs dif) | | 0 1100 | | | | 0011 (decimal 3) |
| +5 | 0101 | 0101 | Yes | 1 | Increment | 1001 |
| −5 | 1011 | +0100 | | | | +0001 |
| (10 abs dif) | | 0 1001 | | | | 1010 (decimal 10) |
| +6 | 0110 | 0110 | Yes | 1 | Increment | 1100 |
| −7 | 1001 | +0110 | | | | +0001 |
| (13 abs dif) | | 0 1100 | | | | 1101 (decimal 13) |
| 0 | 0000 | 0000 | No | 1 | Complement | 1000 |
| +7 | 0111 | +1000 | | | | ↓ |
| (7 abs dif) | | 0 1000 | | | | 0111 (decimal 7) |

Whenever the intermediate result is incremented, the intermediate result always contains at least one "0" before incrementing occurs. Therefore, incrementing the intermediate result does not cause overflow, thereby preserving arithmetic accuracy.

If the final result has the same length as the operands (that is, for n-bit operands the final result is also n-bits) then the final result might overflow. For unsigned operands, the carry-out bit of the n-bit final result is zero and therefore overflow does not occur. For signed operands, however, the most significant bit of the n-bit final result remains a magnitude bit, not a sign bit, and therefore can be used to signify overflow if not interpreted as an unsigned magnitude bit. On the other hand, if the final result exceeds the length of the operands (that is, for n-bit operands the final result contains n+1 bits) then the final result will not overflow. For unsigned operands, the most significant bit of the n+1 bit final result is a magnitude bit that is always a zero. Likewise, for signed operands, the most significant bit of the n+1 bit final result, whether interpreted as a magnitude bit or a sign bit, is always a zero. Therefore, for both signed and unsigned operands, the n+1 bit final result does not overflow.

Figure 3:
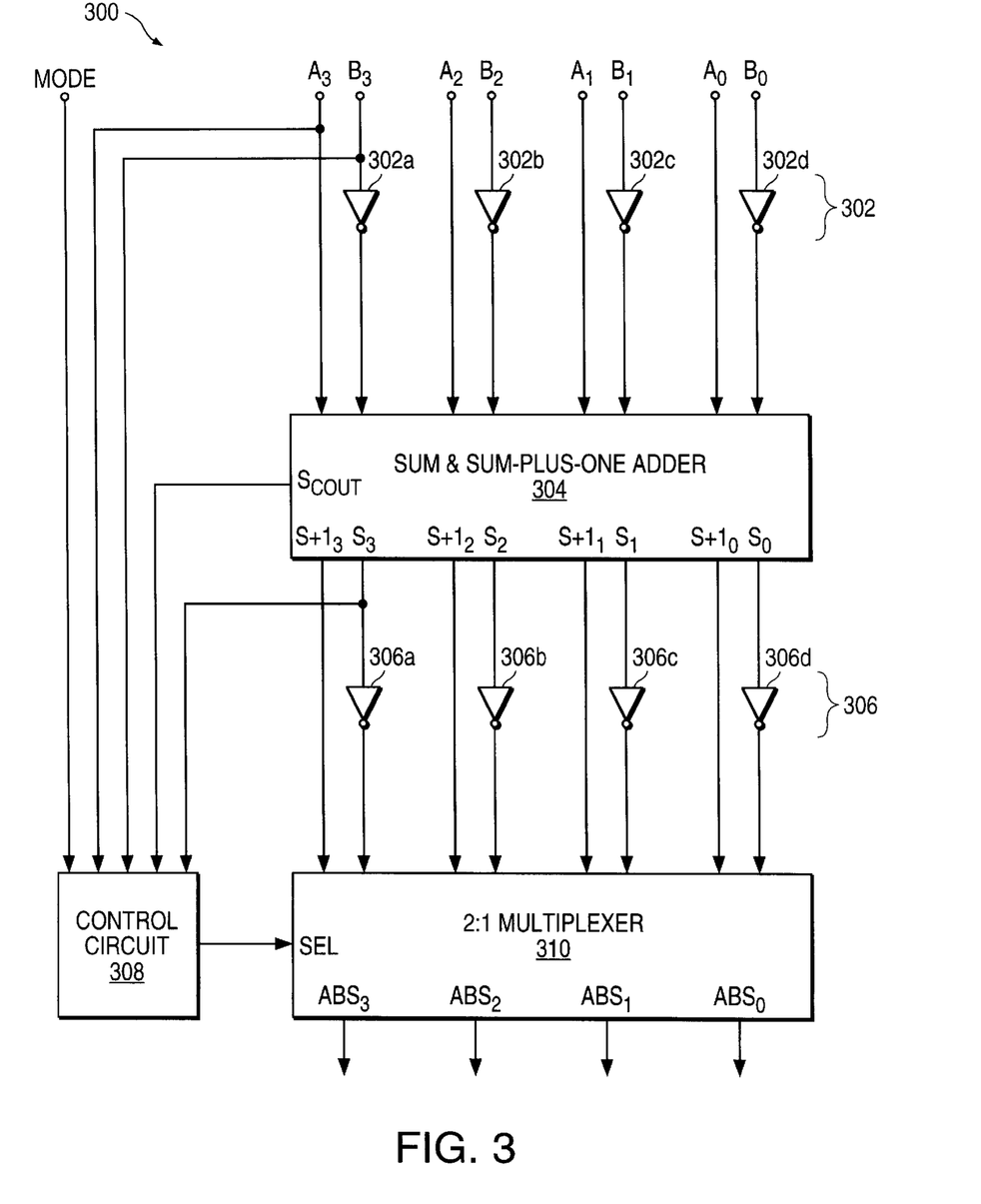
FIG. 3 is a block diagram of a logic circuit in accordance with the present invention.

FIG. 3 is a block diagram of a logic circuit 300 for obtaining an unsigned absolute difference of two signed or unsigned four-bit binary numbers A and B in the manner described above. First inverter circuit 302 has an operand input coupled to the B operand and provides a bit-complemented B operand at its output. First inverter circuit 302 includes inverters 302a, 302b, 302c and 302d. Operand B has its bit position $B_3$ applied to inverter 302a, bit position $B_2$ applied to inverter 302b, bit position $B_1$ applied to inverter 302c, and bit position $B_0$ applied to inverter 302d. Inverters 302a, 302b, 302c and 302d output respective bit-complemented bits $\overline{B_3}$, $\overline{B_2}$, $\overline{B_1}$ and $\overline{B_0}$.

Sum and sum-plus-one adder 304 receives binary numbers A and $\overline{B}$ at its inputs and generates a sum output and a sum-plus-one output. Bit positions $A_3$ and $\overline{B_3}$ are applied to stage 3 of adder 304, bit positions $A_2$ and $\overline{B_2}$ are applied to stage 2 of adder 304, bit positions $A_1$ and $\overline{B_1}$ are applied to stage 1 of adder 304, and bit positions $A_0$ and $\overline{B_0}$ are applied to stage 0 of adder 304. Accordingly, the sum adder generates a sum output consisting of bit positions $S_3$, $S_2$, $S_1$ and $S_0$, and the sum-plus-one adder generates a sum-plus-one output consisting of bit positions $S+1_3$, $S+1_2$, $S+1_1$, and $S+1_0$. The sum adder also generates a carry-out bit position $S_{COUT}$.

Second inverter circuit 306 has an operand input coupled to the sum output and provides a bit-complemented sum output at its output. Second inverter circuit 306 includes inverters 306a, 306b, 306c and 306d. The sum output has its bit position $S_3$ applied to inverter 306a, bit position $S_2$ applied to inverter 306b, bit position $S_1$ applied to inverter 306c, and bit position $S_0$ applied to inverter 306d. Inverters 306a, 306b, 306c and 306d output respective bit-complemented sum output bits $\overline{S_3}$, $\overline{S_2}$, $\overline{S_1}$ and $\overline{S_0}$.

Control circuit 308 receives bits $A_3$, $B_3$, $S_3$, $S_{COUT}$, and a mode signal. The MODE signal is logical 1 for signed numbers and logical 0 for unsigned numbers. Control circuit 308 has a control output coupled to a select input of 2:1 multiplexer 310. Multiplexer 310 receives the bit-complemented sum output at a first input, and the sum-plus-one output at a second input. Control circuit 308 outputs a select signal SEL for causing multiplexer 310 to select either the bit-complemented sum output or the sum-plus-one output. Multiplexer 310 outputs bit positions $ABS_3$, $ABS_2$, $ABS_1$ and $ABS_0$ which provide an unsigned four-bit binary number as the output of logic circuit 300 representing the absolute difference between operands A and B.

Control circuit 308 implements the expression $$SEL = \overline{MODE} \cdot OV_{UNSIGNED} + MODE \cdot (\overline{OV_{SIGNED}} \cdot S_{MSB} + OV_{SIGNED} \cdot \overline{S_{MSB}}) \quad (16)$$

where the unsigned overflow is determined by the expression $$OV_{UNSIGNED} = S_{COUT} \quad (17)$$

and the signed overflow is determined by the expression $$OV_{SIGNED} = (A_{MSB} \cdot \overline{B_{MSB}} \cdot \overline{S_{MSB}}) + (\overline{A_{MSB}} \cdot B_{MSB} \cdot S_{MSB}) \quad (18)$$

Expression (16) can incorporate expressions (17) and (18) and be simplified to yield an equivalent logical expression $$SEL = \overline{MODE} \cdot S_{COUT} + MODE \cdot (\overline{A_{MSB}} \cdot B_{MSB} + \overline{A_{MSB}} \cdot S_{MSB} + B_{MSB} \cdot S_{MSB}) \quad (19)$$

With four-bit operands, expression (19) yields the expression $$SEL = \overline{MODE} \cdot S_{COUT} + MODE \cdot (\overline{A_3} \cdot B_3 + \overline{A_3} \cdot S_3 + B_3 \cdot S_3) \quad (20)$$

so that SEL is 1 to select the sum-plus-one outputs $S+1_3$, $S+1_2$, $S+1_1$, and $S+1_0$ if $\overline{A_3} \cdot B_3 + \overline{A_3} \cdot S_3 + B_3 \cdot S_3$ is logical one for signed numbers, or if $S_{COUT}$ is logical one for unsigned numbers; else SEL is 0 to select the bit-complemented sum outputs $\overline{S_3}$, $\overline{S_2}$, $\overline{S_1}$ and $\overline{S_0}$.

Figure 4:
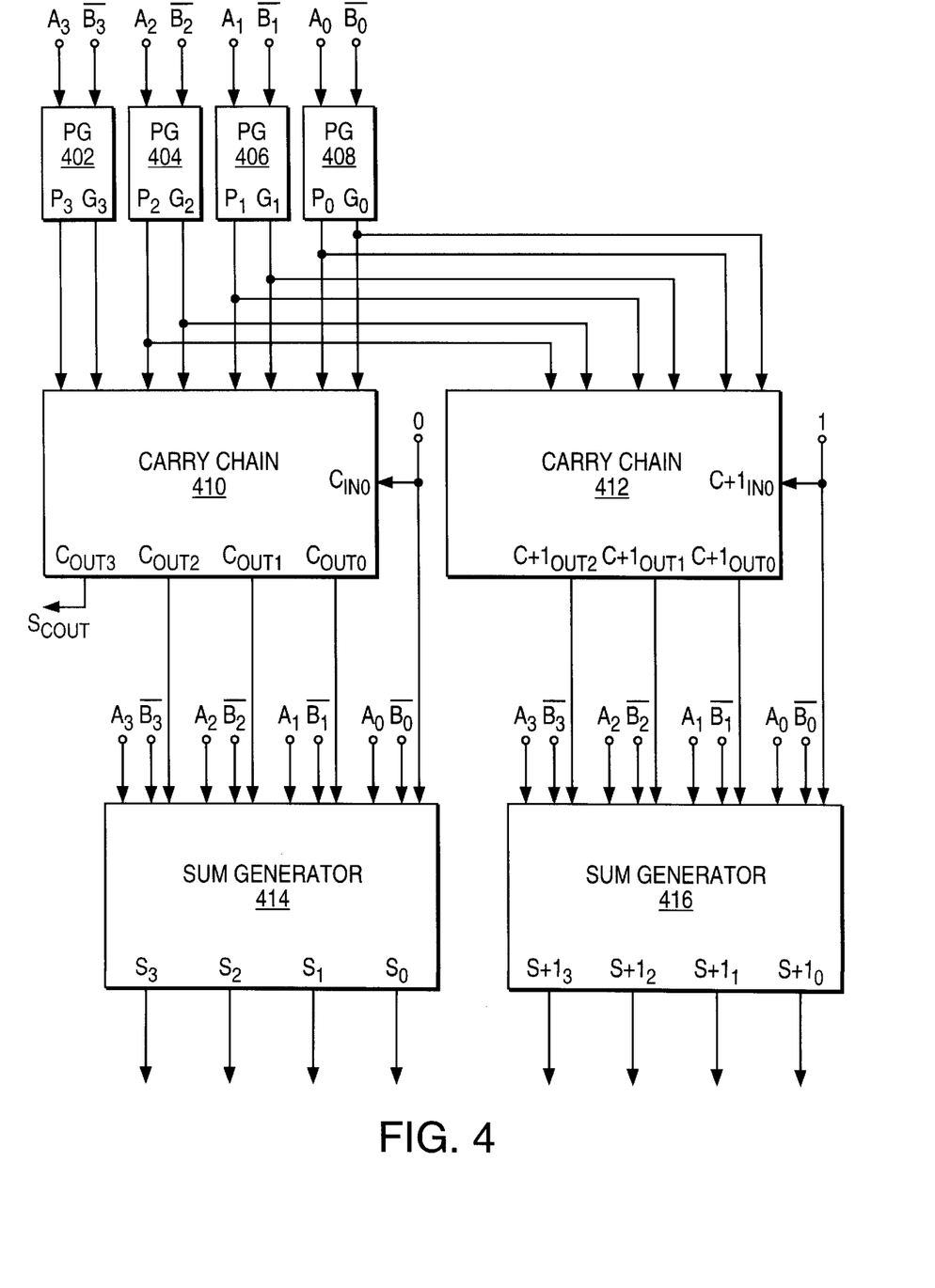
FIG. 4 is a block diagram of an adder suitable for use in the circuit of FIG. 3.

FIG. 4 shows an implementation for adder 304. In this implementation, the sum and sum-plus-one outputs are provided by carry lookahead adders. The carry lookahead adders perform fast addition within the basic step time of an instruction cycle. Propagate-generate (PG) sections 402, 404, 406 and 408 provide propagate and generate signals $P_3$ and $G_3$, $P_2$ and $G_2$, $P_1$ and $G_1$, and $P_0$ and $G_0$ for the respective $A_3\overline{B_3}$, $A_2\overline{B_2}$, $A_1\overline{B_1}$ and $A_0\overline{B_0}$ bit positions of the binary numbers A and $\overline{B}$. The propagate and generate signals are furnished to respective stages of the carry chains 410 and 412, except that $P_3$ and $G_3$ (the most significant stage) need not be furnished to carry chain 412. Carry chain 410 receives a "0" as its least significant carry-in bit $C_{IN0}$, and generates carry-out bits $C_{OUT3}$, $C_{OUT2}$, $C_{OUT1}$ and $C_{OUT0}$ corresponding to the sum of $A_3$ and $\overline{B_3}$, $A_2$ and $\overline{B_2}$, $A_1$ and $\overline{B_1}$, and $A_0$ and $\overline{B_0}$ and a zero, respectively. Carry chain 412 receives a "1" as its least significant carry-in bit $C+1_{IN0}$, and generates carry-out bits $C+1_{OUT2}$, $C+1_{OUT1}$ and $C+1_{OUT0}$ corresponding to the sum of $A_2$ and $\overline{B_2}$, $A_1$ and $\overline{B_1}$, and $A_0$ and $\overline{B_0}$ and a one, respectively. Carry-out bits $C_{OUT2}$, $C_{OUT1}$ and $C_{OUT0}$ provide carry-in bits for stage 3, stage 2, and stage 1, respectively, of sum generator 414, and a zero is provided to stage 0 of sum generator 414. Further, carry-out bits $C+1_{OUT2}$, $C+1_{OUT1}$ and $C+1_{OUT0}$ provide carry-in bits to stage 3, stage 2, and stage 1, respectively, of sum generator 416, and a one is provided to stage 0 of sum generator 416. $C_{OUT3}$ is provided to control circuit 312 as the carry-out bit ($S_{COUT}$) of the sum input. Since carry-out bit $C+1_{OUT3}$ is unnecessary, PG stage 402 is not coupled to carry chain 412.

Sum generator 414 sums $A_3$, $\overline{B_3}$ and $C_{OUT2}$ at stage 3 to provide $S_3$, sums $A_2$, $\overline{B_2}$ and $C_{OUT1}$ at stage 2 to provide $S_2$, sums $A_1$, $\overline{B_1}$ and $C_{OUT0}$ at stage 1 to provide $S_1$, and sums $A_0$, $\overline{B_0}$ and a "0" at stage 0 to provide $S_0$. Sum generator 416 sums $A_3$, $\overline{B_3}$ and $C+1_{OUT2}$ at stage 3 to provide $S+1_3$, sums $A_2$, $\overline{B_2}$ and $C+1_{OUT1}$ at stage 2 to provide $S+1_2$, sums $A_1$, $\overline{B_1}$ and $C+1_{OUT0}$ at stage 1 to provide $S+1_1$, and sums $A_0$, $\overline{B_0}$ and a "1" at stage 0 to provide $S+1_0$. Thus, sum generator 414 provides the sum of the operands A and $\overline{B}$, and sum generator 416 provides the incremented sum of operands A and $\overline{B}$. Each stage of the sum generators may include, for instance, first and second two-input exclusive-or gates (not shown), with the inputs of the first exclusive-or gate and the second input of the second exclusive-or gate receiving the numbers to be summed, the output of the first exclusive-or gate coupled to the first input of the second exclusive-or gate, and the output of the second exclusive-or gate providing the result. Suitable PG sections, carry chains and sum generators are well-known in the art. Furthermore, any circuit such as a carry select adder that implements a sum and a sum-plus-one of two binary numbers may be used for adder 304.

Figure 5:
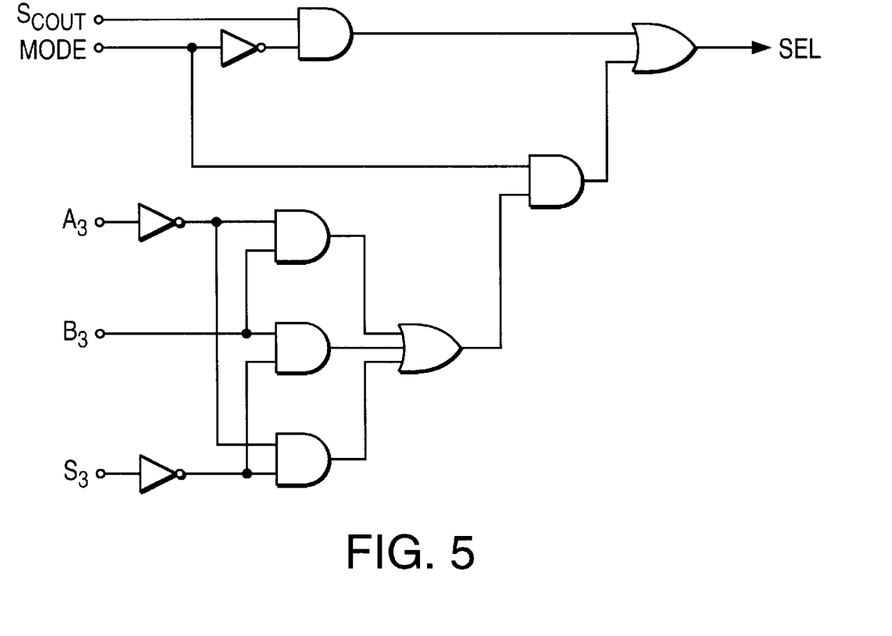
FIG. 5 is a circuit diagram of a control circuit suitable for use in the circuit of FIG. 3.
Figure 6:
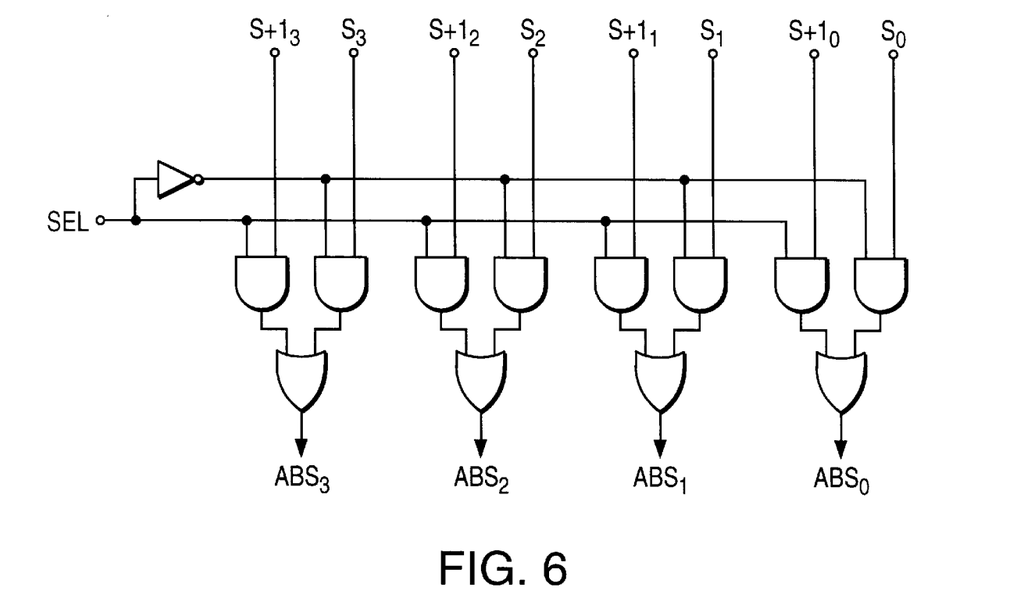
FIG. 6 is a circuit diagram of a multiplexer suitable for use in the circuit of FIG. 3.

FIG. 5 shows an implementation for control circuit 308 in accordance with expression (20) above, and FIG. 6 shows an implementation for multiplexer 310. Numerous 2:1 multiplexer designs and related data selector circuits are well-known in the art.

The description of the invention set forth herein is illustrative, and is not intended to limit the scope of the invention as set forth in the following claims. For example, inverter circuits 302 and 306, adder 304, control circuit 308, and multiplexer 310 may be implemented in any suitable circuitry. The operands can be any bit length of at least two. A general purpose computer or processor can execute the invention in a single instruction cycle (as is preferred) or multiple instruction cycles. The invention is well-suited for many applications besides MPEG motion processing. Variations and modifications of the embodiments disclosed herein may be made based on the description set forth herein, without departing from the scope and spirit of the invention as set forth in the following claims.

What is claimed is:

1. A method of operating a circuit to obtain an absolute difference of first and second unsigned integer operands, such that the absolute difference is an unsigned integer, comprising:

bit-complementing the second operand;

summing the first and bit-complemented second operands to obtain an intermediate result;

incrementing the intermediate result to obtain an incremented intermediate result;

bit-complementing the intermediate result to obtain a bit-complemented intermediate result;

determining whether the intermediate result overflows provided the first and bit-complemented second operands and the intermediate result are considered unsigned numbers;

selecting the incremented intermediate result to obtain the unsigned absolute difference when the overflow occurs; and selecting the bit-complemented intermediate result to obtain the unsigned absolute difference when the overflow does not occur.

2. A method of operating a circuit to obtain an absolute difference of first and second signed integer operands, such that the absolute difference is an unsigned integer, comprising:

bit-complementing the second operand;

summing the first and bit-complemented second operands to obtain an intermediate result;

incrementing the intermediate result to obtain an incremented intermediate result;

bit-complementing the intermediate result to obtain a bit-complemented intermediate result;

determining whether the intermediate result overflows provided the first and bit-complemented second operands and the intermediate result are considered signed numbers;

selecting the incremented intermediate result to obtain the unsigned absolute difference (i) when the overflow occurs and the intermediate result is negative, or (ii) when the overflow does not occur and the intermediate result is positive; and selecting the bit-complemented intermediate result to obtain the unsigned absolute difference (i) when the overflow occurs and the intermediate result is positive, or (ii) when the overflow does not occur and the intermediate result is negative.

3. A method of operating a circuit to obtain an absolute difference of first and second operands, including signed and unsigned integers, such that the absolute difference is an unsigned integer, comprising:

bit-complementing the second operand;

summing the first and bit-complemented second operands to obtain an intermediate result;

incrementing the intermediate result to obtain an incremented intermediate result;

bit-complementing the intermediate result to obtain a bit-complemented intermediate result;

determining whether the intermediate result overflows, provided the first and bit-complemented second operands and the intermediate result are considered signed numbers if the first and second operands are signed numbers, and considered unsigned numbers if the first and second operands are unsigned numbers;

selecting the incremented intermediate result to obtain the unsigned absolute difference (i) when the operands are unsigned numbers and the overflow occurs, (ii) when the operands are signed numbers and the overflow occurs and the intermediate result is negative, or (iii) when the operands are signed numbers and the overflow does not occur and the intermediate result is positive; and selecting the bit-complemented the intermediate result to obtain the unsigned absolute difference (i) when the operands are unsigned numbers and the overflow does not occur, (ii) when the operands are signed numbers and the overflow occurs and the intermediate result is positive, or (iii) when the operands are signed numbers and the overflow does not occur and the intermediate result is negative.

4. The method of claim 3, performed in a single instruction cycle.

5. The method of claim 4, executed by a processor.

6. A method of operating a circuit to obtain an absolute difference of two operands, including signed and unsigned integers, such that the absolute difference is an integer, comprising:

obtaining first and second n-bit operands;

bit-complementing the second operand;

summing the first and bit-complemented second operands to obtain an n-bit intermediate result;

summing the first and bit-complemented second operands and a one to obtain an n-bit incremented intermediate result;

bit-complementing the intermediate result to obtain an n-bit bit-complemented intermediate result;

determining whether the intermediate result overflows provided the first and bit-complemented second operands and the intermediate result are considered signed numbers if the first and second operands are signed numbers, and considered unsigned numbers if the first and second operands are unsigned numbers;

selecting the incremented intermediate result to obtain an absolute difference of the first and second operands (i) when the operands are unsigned numbers and the overflow occurs, (ii) when the operands are signed numbers and the overflow occurs and the intermediate result is negative, or (iii) when the operands are signed numbers and the overflow does not occur and the intermediate result is positive; and selecting the bit-complemented intermediate result to obtain the absolute difference of the first and second operands (i) when the operands are unsigned numbers and the overflow does not occur, (ii) when the operands are signed numbers and the overflow occurs and the intermediate result is positive, or (iii) when the operands are signed numbers and the overflow does not occur and the intermediate result is negative.

7. The method of claim 6, wherein selecting one of the incremented intermediate result and the bit-complemented intermediate result is performed by a multiplexer.

8. The method of claim 6, wherein the intermediate result is obtained at a sum output of an n-bit sum adder, and the incremented intermediate result is obtained at a sum-plus-one output of an n-bit sum-plus-one adder.

9. The method of claim 6, wherein the absolute difference is an unsigned n-bit number which never overflows when the operands are unsigned numbers.

10. The method of claim 6, wherein the absolute difference is an unsigned n-bit number which overflows when the operands are signed numbers and a most significant bit of the n-bit absolute difference is a one.

11. The method of claim 6, wherein the absolute difference is an unsigned n-bit number which never overflows when the operands are unsigned numbers, and which overflows when the operands are signed numbers and a most significant bit of the n-bit absolute difference is a one.

12. The method of claim 6, wherein the absolute difference is an unsigned n+1 bit number in which a most significant bit is a magnitude bit when the operands are unsigned numbers, the magnitude bit is always a zero, and the n+1 bit absolute difference never overflows.

13. The method of claim 6, wherein the absolute difference is a signed n+1 bit number in which a most significant bit is a sign bit when the operands are signed numbers, the sign bit is always a zero, and the n+1 bit absolute difference never overflows.

14. The method of claim 6, wherein the absolute difference is an n+1 bit number in which a most significant bit is a magnitude bit when the operands are unsigned numbers, the most significant bit is a sign bit when the operands are signed numbers, the most significant bit is always a zero, and the n+1 bit absolute difference does not overflow.

15. The method of claim 6, performed by a general purpose computer in a single instruction cycle.

16. An apparatus for obtaining an absolute difference of A and B operands, such that the absolute difference is an unsigned integer, comprising:
  a first inverter circuit having an operand input coupled to the B operand and having an output for providing a bit-complemented B operand;
  a sum adder having a sum output, and having first and second operand inputs coupled respectively to the A operand and the output of the first inverter circuit;
  a sum-plus-one adder having a sum-plus-one output, and having first and second operand inputs coupled respectively to the A operand and the output of the first inverter circuit;
  a control circuit having inputs coupled to a most significant bit position of the A operand, of the B operand, and of the sum output, and to a carry-out bit position of the sum adder, and having a control output;
  a second inverter circuit having an operand input coupled to the sum output and having an output for providing a bit-complemented sum output; and
  a multiplexer having a first input coupled to the output of the second inverter circuit and a second input coupled to the sum-plus-one output, and having a select input coupled to the control output of the control circuit.

17. An apparatus for obtaining an absolute difference of A and B operands, including signed and unsigned integers, such that the absolute difference is an unsigned integer, comprising:
  a first inverter circuit having inputs coupled to the B operand and having an output for providing a bit-complemented B operand;
  a sum adder having a sum output, and having first and second operand inputs coupled respectively to the A operand and the output of the first inverter circuit;
  a sum-plus-one adder having a sum-plus-one output, and having first and second operand inputs coupled respectively to the A operand and the output of the first inverter circuit;
  a control circuit having inputs coupled to a most significant bit position of the A operand, to a most significant bit position of the B operand, to a most significant bit position of the sum output, to a carry-out bit position of the sum adder, and to a mode signal that indicates whether the A and B operands are signed or unsigned numbers, and having a control output;
  a second inverter circuit having inputs coupled to the sum output and having an output for providing a bit-complemented sum output; and
  a multiplexer having a first input coupled to the output of the second inverter circuit and a second input coupled to the sum-plus-one output, and having a select input coupled to the control output of the control circuit;
  wherein the control output of the control circuit causes the multiplexer to select the second input thereof (i) when the mode signal indicates unsigned numbers and overflow occurs in the sum adder, (i) when the mode signal indicates signed numbers and overflow occurs in the sum adder and the sum output is negative, or (iii) when the mode signal indicates signed numbers and no overflow occurs in the sum adder and the sum output is positive; and
  wherein the control output of the control circuit causes the multiplexer to select the first input thereof (i) when the mode signal indicates unsigned numbers and no overflow occurs in the sum adder, (ii) when the mode signal indicates signed numbers and overflow occurs in the sum adder and the sum output is positive, (iii) when the mode signal indicates signed numbers and no overflow occurs in the sum adder and the sum output is negative.

18. The apparatus of claim 17, wherein the sum adder includes first propagate-generate sections coupled to a first carry chain coupled to a first sum generator that provides the sum output, and the sum-plus-one adder includes second propogate-generate sections coupled to a second carry chain coupled to a second sum generator that provides the sum-plus-one output.

19. The apparatus of claim 18, wherein the sum adder and the sum-plus-one adder share the first and second propogate-generate sections, the first carry chain and the first sum generator have a least significant carry-in bit set to logical 0, and the second carry chain and the second sum generator have a least significant carry-in bit set to logical 1.

20. An apparatus for obtaining an absolute difference of A and B operands, including signed and unsigned integer numbers, such that the absolute difference is an unsigned integer, comprising:
  a first inverter circuit having an operand input coupled to the B operand and having an output for providing a bit-complemented B operand;
  a sum adder having a sum output, and having first and second operand inputs coupled respectively to the A operand and the output of the first inverter circuit;

a sum-plus-one adder having a sum-plus-one output, and having first and second operand inputs coupled respectively to the A operand and the output of the first inverter circuit;

a control circuit having inputs coupled to a most significant bit position of the A operand ($A_{MSB}$), a most significant bit position of the B operand ($B_{MSB}$), a most significant bit position of the sum output ($S_{MSB}$), a carry-out bit position of the sum adder ($S_{COUT}$), and a mode signal (MODE) that indicates whether the A and B operands are signed or unsigned numbers, and having a control output;

a second inverter circuit having an operand input coupled to the sum output and having an output for providing a bit-complemented sum output; and a multiplexer having a first input coupled to the output of the second inverter circuit and a second input coupled to the sum-plus-one output, and having a select input coupled to the control output of the control circuit;

wherein the output of the control circuit is determined in accordance with the expression $$SEL = \overline{MODE} \cdot S_{COUT} + MODE \cdot (\overline{A_{MSB} \cdot B_{MSB}} + \overline{A_{MSB}} \cdot S_{MSB} + B_{MSB} \cdot \overline{S_{MSB}}).$$

21. An apparatus for obtaining an absolute difference of first and second operands, including signed and unsigned integers, such that the absolute difference is an unsigned integer, comprising:

means for recognizing whether the first and second operands are signed or unsigned numbers;

means for bit-complementing the second operand;

means for summing the first and bit-complemented second operands to obtain an intermediate result;

means for determining whether the intermediate result overflows;

means for incrementing the intermediate result to obtain the unsigned absolute difference of the first and second operands (i) when the operands are unsigned numbers and the overflow occurs, (ii) when the operands are signed numbers and the overflow occurs and the intermediate result is negative, or (iii) when the operands are signed numbers and the overflow does not occur and the intermediate result is positive; and means for bit-complementing the intermediate result to obtain the unsigned absolute difference of the first and second operands (i) when the operands are unsigned numbers and the overflow does not occur, (ii) when the operands are signed numbers and the overflow occurs and the intermediate result is positive, or (iii) when the operands are signed numbers and the overflow does not occur and the intermediate result is negative.

* * * * *